United States Patent
Sato et al.

(10) Patent No.: US 8,547,312 B2
(45) Date of Patent: Oct. 1, 2013

(54) DISPLAY APPARATUS

(75) Inventors: Yasuki Sato, Tokyo (JP); Kiyomichi Fukushima, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 156 days.

(21) Appl. No.: 12/737,581

(22) PCT Filed: Jul. 28, 2008

(86) PCT No.: PCT/JP2008/063539
§ 371 (c)(1),
(2), (4) Date: Jan. 26, 2011

(87) PCT Pub. No.: WO2010/013307
PCT Pub. Date: Feb. 4, 2010

(65) Prior Publication Data
US 2011/0122162 A1    May 26, 2011

(51) Int. Cl.
*G09G 3/36* (2006.01)
*H05K 7/20* (2006.01)

(52) U.S. Cl.
USPC .............................. 345/87; 361/694; 361/695

(58) Field of Classification Search
USPC ...... 361/139, 152, 158, 600, 678, 679.02–49, 361/694, 695, 701; 345/87, 690; 454/187; 313/46; 349/58; 348/748; 362/362
See application file for complete search history.

(56) References Cited

U.S. PATENT DOCUMENTS

| | | | | |
|---|---|---|---|---|
| 5,173,839 | A | * | 12/1992 | Metz, Jr. ........................ 361/706 |
| 5,256,498 | A |   | 10/1993 | Ohzu et al. |
| 5,869,919 | A | * | 2/1999 | Sato et al. ....................... 313/17 |
| 6,043,979 | A | * | 3/2000 | Shim ............................. 361/695 |
| 6,104,451 | A | * | 8/2000 | Matsuoka et al. .............. 349/58 |
| 6,989,986 | B2 | * | 1/2006 | Kumagai et al. .......... 361/679.27 |
| 7,042,156 | B2 | * | 5/2006 | Sakamoto ..................... 313/583 |
| 7,120,011 | B2 | * | 10/2006 | Takahashi et al. ........ 361/679.21 |

(Continued)

FOREIGN PATENT DOCUMENTS

| | | |
|---|---|---|
| CN | 2582172 Y | 10/2003 |
| JP | 04005624 A * | 1/1992 |

(Continued)

OTHER PUBLICATIONS

Chinese Office Action dated Aug. 9, 2012, with English translation.

*Primary Examiner* — Bipin Shalwala
*Assistant Examiner* — Michael J Jansen, II
(74) *Attorney, Agent, or Firm* — McGinn Intellectual Property Law Group, PLLC

(57) ABSTRACT

A display apparatus includes a driving circuit portion driving a display panel portion, in which the driving circuit portion and a power unit which supplies electric power to the driving circuit portion are arranged on the back surface side, a case housing both the driving circuit portion and the power unit with the display panel portion, a partitioning wall portion which divides a housing space of the case, a gap which is formed between the display panel portion and the partitioning wall portion, and a cooling fan which leads outside air into the gap and which is arranged on the partitioning wall portion. The driving circuit portion and the power unit are arranged on an opposite side of the partitioning wall portion against the gap. The gap is shrunk along a direction from downside to upside of the display panel portion.

16 Claims, 3 Drawing Sheets

(56) References Cited

U.S. PATENT DOCUMENTS

| | | | |
|---|---|---|---|
| 7,164,586 B2* | 1/2007 | Lin | 361/714 |
| 7,259,964 B2* | 8/2007 | Yamamura et al. | 361/697 |
| 7,292,446 B2* | 11/2007 | Bae | 361/719 |
| 7,299,996 B2* | 11/2007 | Garrett et al. | 236/94 |
| 7,342,792 B2* | 3/2008 | Kim et al. | 361/704 |
| 7,397,656 B2* | 7/2008 | Lee et al. | 361/679.27 |
| 7,492,099 B2* | 2/2009 | Bang | 313/582 |
| 7,527,409 B2 | 5/2009 | Atarashi et al. | |
| 7,944,712 B2* | 5/2011 | Kitada et al. | 361/810 |
| 2002/0014840 A1* | 2/2002 | Kaneko et al. | 313/587 |
| 2003/0016519 A1* | 1/2003 | Bachman | 361/818 |
| 2003/0043091 A1* | 3/2003 | Takeuchi et al. | 345/84 |
| 2004/0036819 A1* | 2/2004 | Ryu et al. | 349/58 |
| 2005/0047067 A1* | 3/2005 | Bang et al. | 361/681 |
| 2005/0117293 A1* | 6/2005 | Yokoyama | 361/688 |
| 2005/0243106 A1* | 11/2005 | Bae et al. | 345/679 |
| 2005/0286228 A1* | 12/2005 | Kim | 361/704 |
| 2006/0098412 A1* | 5/2006 | Kim et al. | 361/704 |
| 2006/0104023 A1* | 5/2006 | Lee et al. | 361/687 |
| 2006/0109614 A1* | 5/2006 | Lee et al. | 361/679 |
| 2006/0164804 A1* | 7/2006 | Kim et al. | 361/688 |
| 2006/0199514 A1* | 9/2006 | Kimura | 454/237 |
| 2006/0232919 A1* | 10/2006 | Jeong | 361/681 |
| 2006/0291162 A1* | 12/2006 | Kim | 361/695 |
| 2007/0076431 A1 | 4/2007 | Atarashi et al. | |
| 2007/0103863 A1* | 5/2007 | Kim | 361/687 |
| 2007/0103864 A1* | 5/2007 | Kim | 361/687 |
| 2007/0103866 A1* | 5/2007 | Park | 361/695 |
| 2007/0103909 A1* | 5/2007 | Park | 362/294 |
| 2007/0121297 A1* | 5/2007 | Uchizono et al. | 361/704 |
| 2008/0083527 A1* | 4/2008 | Horng et al. | 165/80.3 |
| 2008/0088573 A1* | 4/2008 | Kim | 345/102 |
| 2008/0089028 A1* | 4/2008 | Kim et al. | 361/695 |
| 2008/0165496 A1* | 7/2008 | Kang et al. | 361/692 |
| 2008/0218446 A1* | 9/2008 | Yamanaka | 345/60 |
| 2008/0239634 A1* | 10/2008 | Nakao et al. | 361/681 |
| 2008/0285290 A1* | 11/2008 | Ohashi et al. | 362/373 |
| 2009/0009047 A1* | 1/2009 | Yanagawa et al. | 313/46 |
| 2009/0147175 A1* | 6/2009 | Tsumura et al. | 349/58 |
| 2009/0174626 A1* | 7/2009 | Isoshima et al. | 345/55 |
| 2011/0026224 A1* | 2/2011 | Ioki et al. | 361/695 |

FOREIGN PATENT DOCUMENTS

| | | |
|---|---|---|
| JP | 6-82745 A | 3/1994 |
| JP | 6-281905 A | 10/1994 |
| JP | 11-258569 A | 9/1999 |
| JP | 2001-264883 A | 9/2001 |
| JP | 2004-109306 A | 4/2004 |
| JP | 2007-101766 A | 4/2007 |
| JP | 2007-250276 A | 9/2007 |

* cited by examiner

6

DISPLAY APPARATUS

TECHNICAL FIELD

The present application relates to a display apparatus.

BACKGROUND ART

In a display apparatus in a flat shape to which, for example, a liquid crystal is applied, there are heat generation sources, for example, a driving circuit on a backside, a power unit and a backlight. Further, to radiate the heat for protection of; for example, the liquid crystal from the heat generated by the apparatus, it is necessary to appropriately cool down by, for example, using an air vent on a case that contains, for example, a driving circuit and using a cooling fan.

In conventional arts, a constitution of a liquid crystal display apparatus 51 shown in FIG. 3 is known. As shown in FIG. 3, the liquid crystal display apparatus 51 includes: a liquid crystal display panel portion 2 arranged inside a thin case 10 while a front surface of the liquid crystal display panel portion 2 is exposed outside; and a partitioning wall portion 11 which divides a housing space of the case 10 into a front portion and a back portion, wherein a gap 2R is formed between the partitioning wall 11 and a back surface 2a, and in a space formed on an opposite side of the partitioning wall 11 from the gap 2R, both a driving circuit portion 3 of the liquid crystal panel portion 2 and a power unit 4 which supplies the power to the driving circuit portion 3 are included. Further, in such a constitution, a cooling fan 66 is arranged at an upper portion of the gap 2R, and the air A inside the case 10 is ventilated through an air vent formed on the case 10.

It should be noted that other cooling method different from such a cooling method is described in Patent Document 1 shown below that discloses a liquid crystal display apparatus with a constitution including: a substrate attachment board having both a fist surface which faces the liquid crystal panel while holding a light source board on which a backlight is implemented and a nozzle formed at a position on the first surface corresponding to a position of the light source implemented on the light source board; and a fan which leads the outside air onto an opposite surface opposite to the first surface of the substrate attachment board, wherein the backlight is cooled by blowing the outside air lead onto the opposite surface of the substrate attachment board onto the back surface of the light source board from the nozzle.
[Patent Document 1] Japanese Patent Application, First Publication No. 2007-250276

DISCLOSURE OF INVENTION

Technical Problem

On the other hand, the above-described display apparatus has a problem in which warm air inside the case causes an updraft, the warm air gathers at an upper portion of the case and causes high temperature, and particularly it is not possible to appropriately cool down due to an arrangement of the backlight, power unit, and other elements that are heat generation sources.

In the prior arts, there is a problem in which it is not possible to effectively cool down the whole portion because the cooling fan is arranged at an upper portion of the gap.

The present invention is conceived in consideration of the above-described problems and has an object to control maldistribution of temperature inside a display apparatus.

Technical Solution

To achieve the above-described object, the present invention is characterized by including: a driving circuit portion driving a display panel portion in a flat shape while a light source is arranged on a side of a back surface of the display panel portion, and the driving circuit portion and a power unit which supplies electric power to the driving circuit portion are arranged on a side of the back surface; a case housing both the driving circuit portion and the power unit that are arranged on a side of the back surface of the display panel portion; a partitioning wall portion which forms a space for housing both the driving circuit portion and the power unit while maintaining a gap between the back surface of the display panel portion and the partitioning wall portion; and a cooling fan 6 which leads outside air into the gap and which is arranged on the partitioning wall portion, wherein the gap is shrunk along a direction from downside to upside of the display panel portion.

DESCRIPTION OF THE REFERENCE SYMBOLS

Figure 1:
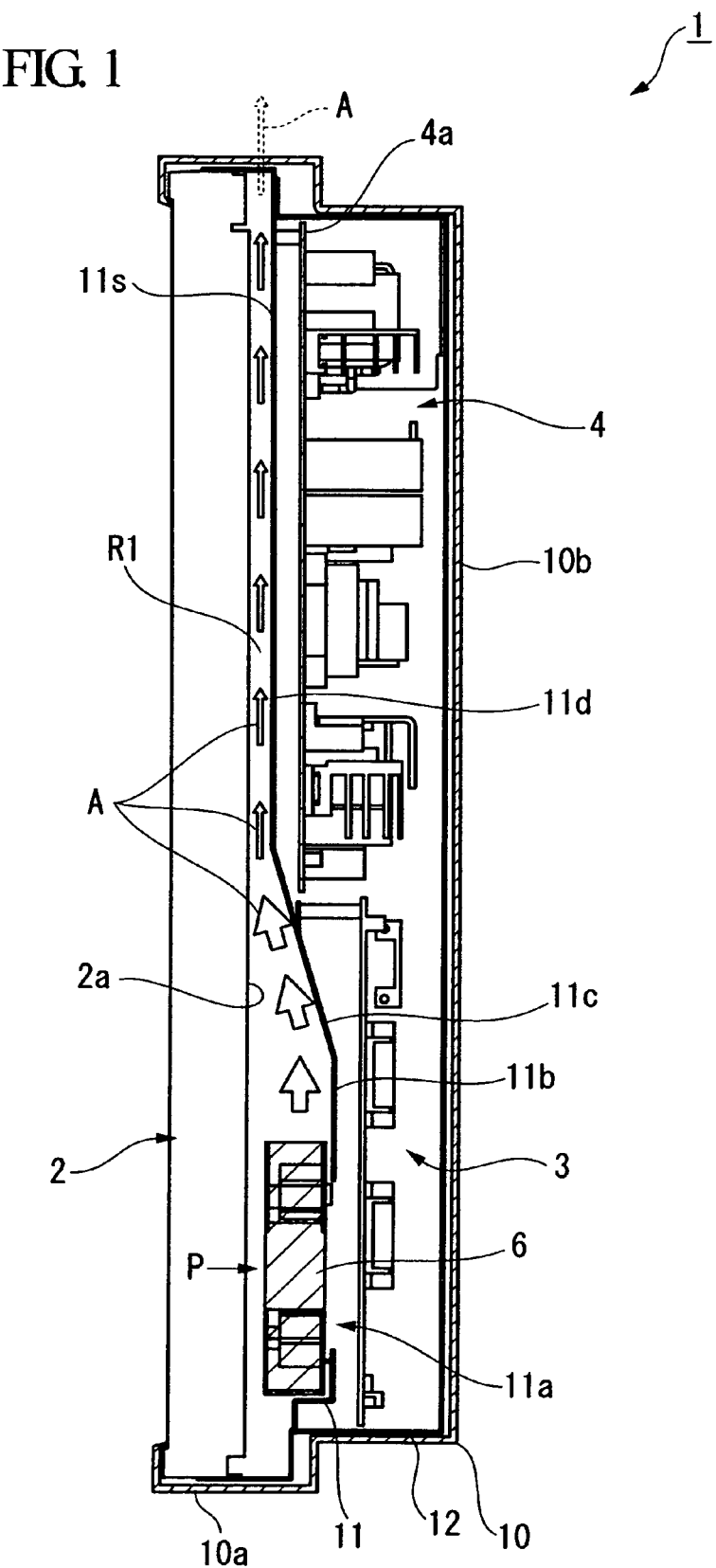
FIG. 1 is a cross section along a vertical direction of a liquid crystal display apparatus of one embodiment of the present invention.

1 . . . liquid crystal display apparatus
2 . . . liquid crystal display panel portion (display panel portion)
2a . . . back surface
3 . . . driving circuit portion
4 . . . power unit
4a . . . circuit board
6 . . . multiblade fan (cooling fan)
10 . . . case
10a . . . panel holding portion
10b . . . protruding portion
11 . . . partitioning wall portion
11a . . . circular aperture
11b . . . first flat portion
11c . . . tapered portion
11d . . . second flat portion
11s . . . main board
12 . . . covering portion
R1 . . . gap
A . . . air

BEST MODE FOR CARRYING OUT THE INVENTION

Hereinafter, in reference to the drawings, one embodiment of the present invention is explained. The embodiment explained below is one example of the embodiments of the present invention, and the present invention is not limited to the embodiment.

FIG. 1 is a cross section along a vertical direction of a liquid crystal display apparatus 1 of one embodiment of the present invention. The liquid crystal display apparatus 1 is a thin monitor formed so as to be vertically long and as shown in FIG. 1, includes: a liquid crystal panel portion 2; a driving circuit portion 3 driving the liquid crystal panel portion 2; a power unit 4 which feeds the electric power to the driving circuit portion 3; a case 10 housing the liquid crystal display panel 2, the driving circuit portion 3 and the power unit 4; a partitioning wall portion 11 which divides a housing space of the case 10; a covering portion 12 which covers the driving circuit portion 3 and the power unit 4; and a multiblade fan 6 cooling inside of the case 10.

The liquid crystal display portion 2 is formed in a rectangular plate shape and to which a back light (not shown in the drawings) of a so-called downright type is applied as a light source. More specifically, several cold-cathode tubes are arranged at regular intervals in parallel with each other along a longitudinal direction (vertical direction) of the liquid crystal panel portion 2.

The driving circuit portion 3, in which a booster circuit for lighting the cold-cathode tubes is involved, drives the liquid crystal display panel 2.

The power unit 4 feeds the power to the driving circuit portion 3 and the multiblade fan 6 and is constituted from multiple electric components mounted on the circuit board 4a. Comparatively larger electric components are used for each of the electric components which constitute the power unit 4 than the electric components of the driving circuit portion 3, and the power unit 4 is thicker than the driving circuit portion 3.

The case 10 includes: a panel holding portion 10a which has a front surface that is largely open and which is formed in a frame shape so as to hold the liquid crystal display panel 2; and a protruding portion 10b which is connected to the panel holding portion 10a, which is formed so as to protrude from a center portion of a backside of the panel holding portion 10a and which mainly houses the driving circuit portion 3 and the driving circuit portion 3.

An air vent (not shown in the drawings) in communication with the outside is formed at an upper portion of the panel holding portion 10a, and an inlet aperture (not shown in the drawings) in communication with the outside is formed on the driving circuit portion 3.

In the case 10, the panel holding portion 10a holds the liquid crystal display panel portion 2 so as to expose a front surface of the liquid crystal display panel portion 2 toward outside while the back surface 2a is arranged so as to be inside the case 10, and in addition, the case 10 houses both the driving circuit portion 3 at a lower portion of the protruding portion 10b and the power unit 4 at an upper portion of the protruding portion 10b while the liquid crystal display panel portion 2, the driving circuit portion 3 and the power unit 4 are arranged so as to be substantially in parallel at intervals.

The partitioning wall portion 11 which is made form a metal plate, which is arranged between the liquid crystal display panel portion 2, the driving circuit portion 3 and the power unit 4 so as to divide a housing space of the case 10 into front and back, has a main board 11s substantially formed in a rectangular shape which has a board surface substantially the same size as the back surface 2a of the liquid crystal display panel 2.

The main board 11s is arranged so as to face the back surface 2a of the liquid crystal display panel 2 across a gap R1, is formed in a flat shape, and includes: a first flat portion 11b on which a circle aperture 11a is formed and which extends in parallel with the back surface 2a of the liquid crystal display panel portion 2; a tapered surface 11c which obliquely extends from an edge portion of the flat portion 11b in a manner in which the tapered surface 11c gradually approaches to the back surface 2a of the liquid crystal display panel portion 2 in a direction from a downside to an upside; and a second flat portion 11d which extends from an edge portion of the tapered surface 11c in parallel with the back surface 2a of the liquid crystal display panel portion 2.

In accordance with such a constitution, the gap R1 between the main board 11s and the liquid crystal display panel portion 2 is constant in a direction form downside to upside in a portion formed by the first flat portion 11b, but the gap R1 is gradually shrunk in a portion formed by the tapered portion 11c, and the gap R1 is constant again in a portion formed by the second flat portion 11d.

Further, both the driving circuit portion 3 and the power unit 4 are fixed on the main board 11s so as to be set at an opposite side against the gap R1, the driving circuit portion 3 is set on the second flat portion 11d, and the power unit 4 is set on both the first flat portion 11b and the tapered portion 11c.

It should be noted that other than the circle aperture 11a shown in FIG. 1, a pair of the circle apertures 11a are formed at the same positions in a vertical direction and at both a deep position and a shallow position along a direction perpendicular to the drawings, and three circle apertures 11a are formed in total.

The covering portion 12 is, like the liquid crystal display panel portion 2, made from a metallic plate, is connected to the partitioning wall portion 11 so as to be integrated, and covers both the driving circuit portion 3 and the power unit 4 on an opposite side against the gap R1. A through-hole (not shown in the drawings) is formed on the covering portion 12 at a position corresponding to an inlet aperture (not shown in the drawings) formed on the protruding portion 10b.

Both the partitioning wall portion 11 and the covering portion 12 that are connected each other in an integrated manner are as shown in FIG. 1, fixed on a side of the liquid crystal display panel portion 2 and are sandwiched between the case 10 and the liquid crystal display panel portion 2. It should be noted that a through-hole (not shown in the drawings) is formed at a position on the partitioning wall portion 11 substantially corresponding to a position of the air vent formed on the case 10.

Figure 2:
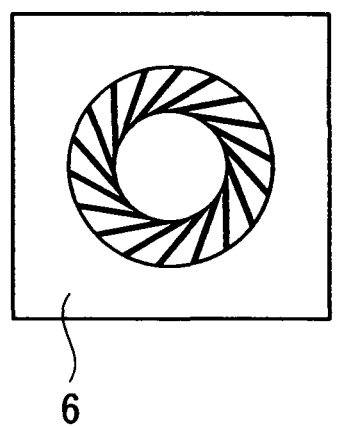
FIG. 2 is a drawing showing substantial portions of a liquid crystal display apparatus of one embodiment of the present invention.
Figure 3:
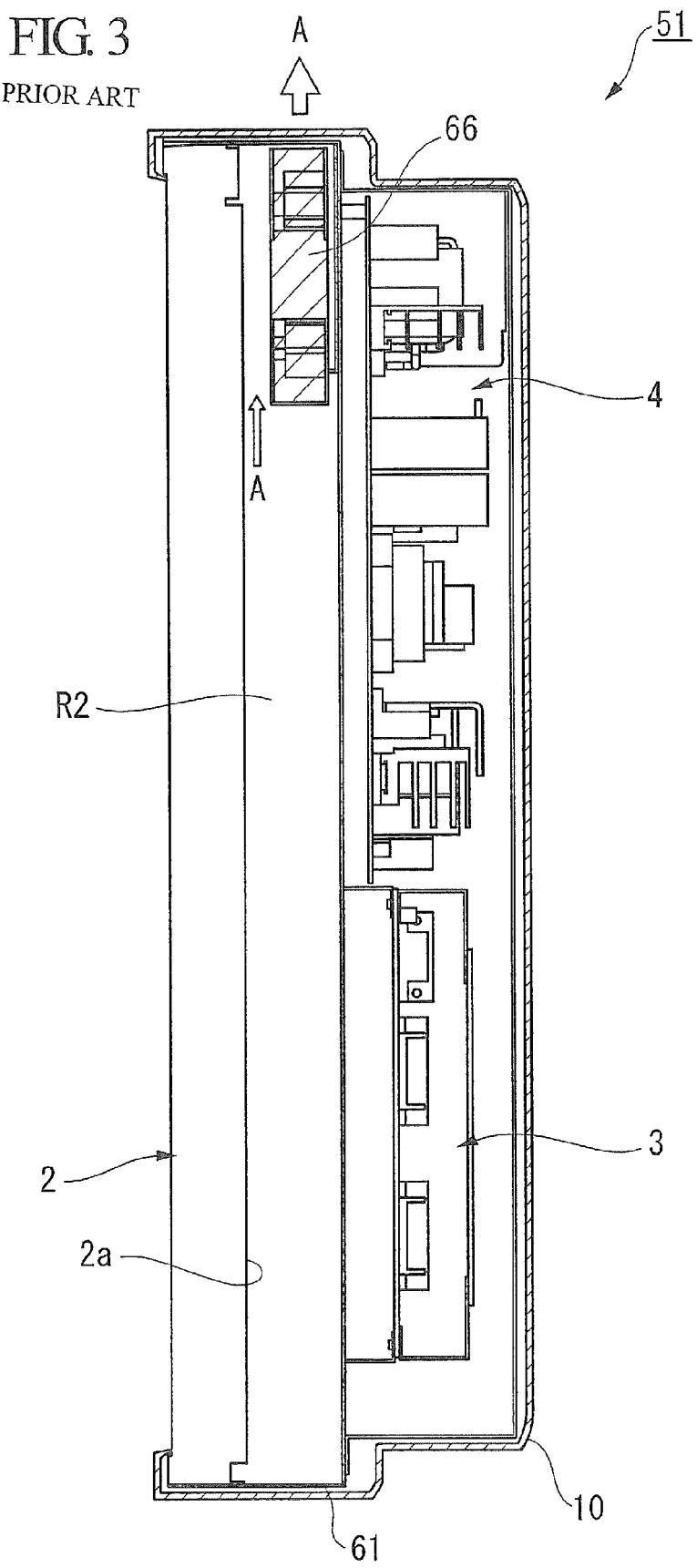
FIG. 3 is a cross section along a vertical direction showing a liquid crystal display apparatus of a prior art.

The multiblade fans (cooling fan, side flow fan) 6 that are three are arranged at a lower position of the gap R1, and more specifically, the multiblade fans 6 are arranged so as to cover each of the circle apertures 11a from a side of the gap R1. In other words, as shown in FIG. 2, the multiblade fan 6 leads the air along a direction of a rotation axis of the multiblade fan 6 through the circle aperture 11a and blows the air in centrifugal directions.

Further, a heat radiation method of the liquid crystal display apparatus 1 of the above-described constitution is explained.

First, when a main power supply of the liquid crystal display apparatus 1 is turned on, the electric power is supplied to the driving circuit portion 3 from the power unit 4, and the driving circuit portion 3 drives the liquid crustal display panel 2. Simultaneously, the electric power is supplied to the multiblade 6, and the blades of the multiblade fan 6 are rotated.

When the liquid crystal display apparatus 1 is used, the cold-cathode tubes of the liquid crystal display panel portion 2 cause heat, and in addition, the electric components of both the driving circuit portion 3 and the power unit 4 cause heat. Here, the amount of heat generation is ascending in an order of the liquid crystal display panel portion 2, the cold-cathode tubes, the electric components of the power unit 4 and the electric components of the driving circuit portion 3. That is, a portion of the heat caused by the cold-cathode tubes is conducted to the back surface 2a of the liquid crystal display panel 2, and the heat generated by the power unit 4 is conducted to the partitioning wall portion 11.

The heat caused by the liquid crystal display panel 2, the power unit 4 and the driving circuit portion 3 has tendency to move to an upper portion inside the case 10.

On the other hand, the multiblade fan 6 leads the air along a direction of an axis through the circle aperture 11a and blows the air in centrifugal directions. More specifically, the multiblade fan 6 lowers the pressure inside the protruding portion 10b compared to the air pressure, leads the air A from the inlet aperture (not shown in the drawings) formed on the protruding portion 10b and after this, blows the air A in centrifugal directions inside the gap R1.

The air A blown into the gap R1 flows toward the air vent formed on an upper portion of the case 10 in a direction from downside to upside in the gap R1. Here, a cross-section of the gap R1 in a horizontal direction (cross-section of a flow path of the air A) is gradually shrunk along a direction from downside to upside, and the velocity of the air A which is uniform at the first flat portion 11b gradually increases while passing through the tapered portion 11c. After this, the air A with increased velocity flows into a portion of the second flat portion 11d, passes through the second flat portion 11d while maintaining the velocity and is blown off toward outside of the case 10 through the through-hole of the partitioning wall portion 11. That is, the air A gathers heat by touching the liquid crystal display panel portion 2, the back surface 2a and the main board 11s while flowing through the gap R1, and then releases the heat outside.

More particularly, at a lower portion of the case 10, where comparatively less heat stays than a upper portion, the air blown into the gap R1 gathers the heat from the back surface 2a and the first flat portion 11b. After this, the air A flows upward through the tapered portion 11c and is blown off toward outside from the through-hole. In such an operation, the velocity of the air A inside the gap R1 has already been increased at a portion of the second flat portion 11d, and the amount of heat gathered by the air A from the back surface 2a and the second flat portion 11d is improved. Further, the heat gathered at a portion of the second flat portion 11d is released outside in a comparatively short time.

Therefore, the heat is effectively gathered by the sir A at a portion of the second flat portion 11d, and a difference of the heat is decreased between an upper portion of the case 10 where the heat tends to stay and a lower portion of the case 10 where the less heat stays.

After this, when the main power supply is turned off, the electric power supplied from the power unit 4 to the driving circuit portion 3 is stopped, and operation of the liquid crystal display panel 2 is stopped. Simultaneously, the electric power supplied to the multiblade fan 6 is stopped, the air A blown into the gap R1 is stopped, and the heat which stays inside yet is released without any operations.

As described above, in accordance with the liquid crystal display apparatus 1, the gap R1 between the back surface 2 of the liquid crystal display panel portion 2 and the partitioning wall portion 11 is gradually shrunk along a direction from downside to upside of the liquid crystal display panel portion 2, and the velocity of the air A lead into by the multiblade fan 6 is comparatively larger at an upper side than at a lower side of the gap R1. Due to such a constitution, it is possible to have higher cooling efficiency (heat transfer coefficient) of the liquid crystal panel portion 2 and the partitioning wall portion 11 at an upper side of the case 10 than a lower side by using the air A, and it is possible to improve the cooling efficiency at an upper side in the liquid crystal display apparatus 1. Therefore, a difference of the heat is decreased between an upper side and a lower side, and it is possible to control maldistribution of temperature inside the liquid crystal display apparatus 1.

In addition, it is possible to make an overall constitution of the display apparatus comparatively simple, and it is possible to improve balance of the weight compared to a case of arranging the multiblede fan 6 at an upper portion of the case 10 because the multiblede fan 6 is arranged at a lower portion of the case 10

Further, it is possible to efficiently conduct the heat caused by the power unit 4 to the air A flowing in the gap R1 because the partitioning wall portion 11 is made from the metal that has improved conductivity of the heat. Furthermore, it is possible to reduce the number of constitutional elements because the partitioning wall portion 11 can be used as a metallic plate used for bracing the liquid crystal display panel portion 2. In addition, a metallic plate has improved processability, and is it possible to form the gap R1 so as to be gradually shrunk along a direction from downside to upside without difficulty.

Further, the multiblade fan 6 leads the outside air along a direction of an axis which is perpendicular to the liquid crystal display panel portion 2 and blows the air along a direction which is parallel with the liquid crystal display panel portion 2, and it is possible to cause a difference of pressure of the winds with comparatively less difficulty. Therefore, it is possible to arrange electric components despite the gap R1 of the first flat portion 11b is formed so as to be comparatively small, and further, it is possible to design the liquid crystal display apparatus 1 so as to be thin as a whole while achieving improved cooling efficiency.

Further, the gap R1 is designed so as to be wide in an area at which the multiblade fan 6 is arranged and is designed so as to be narrow in an area at which the power unit 4 is arranged, due to such a constitution, it is possible to install the multiblade fan 6 in a gap which is designed so as to be wide, and the power unit 4 which requires a comparatively large occupied space is arranged at a space corresponding to a narrow portion. Further, it is possible to improve cooling efficiency regarding the power unit 4 which is the largest heat generation source second to the liquid crystal display panel portion 2. That is, when the liquid crystal display apparatus 1 is observed as a whole, it is understood that it is possible to achieve both a thin/small apparatus and improved cooling efficiency.

Further, it is possible to efficiently increase the velocity of the air A flowing in the gap R1 because the partitioning wall portion 11 is tapered between a wide area and a narrow area of the gap R1.

It should be noted that operation steps, a shape of each constitutional element, a combination of constitutional elements and the like shown in the above-described embodiment are examples, and it is possible to conduct various changes within a scope of the present invention based on, for example, requirements regarding design issues.

For example, in the above-described embodiment, the partitioning wall portion is made form the metal, however, it is possible to use other materials. Furthermore, in the above-described embodiment, the partitioning wall portion 11 is made only from the metallic plate, however, it is possible to constitute a portion of the partitioning wall portion 11 by using a circuit board on which the driving circuit portion 3 is mounted. In such a constitution, a portion of the partitioning wall portion 11 is constituted from a circuit board, hereby, it is possible to reduce the weight of the partitioning wall portion 11, and it is possible to improve the cooling efficiency of the driving circuit portion 3 because the air A flowing in the gap R1 directly touches the circuit board. In a similar manner, it is possible to constitute a portion of the partitioning wall portion 11 by using the circuit board 4a on which the power unit 4 is mounted.

Further, a constitution is disclosed in which the multiblade fan 6 is used in the above-described embodiment, however, it is possible to install an additional centrifugal fan, and it is possible to change the arrangement and install, for example, an axial fan and a mixed flow fan.

Further, a constitution is applied in the above-described embodiment in that the tapered portion 11c is arranged at a portion which is approximately a center of the main board 11s so as to shrink the gap R1, however, it is possible to apply a constitution in which an overall portion along a vertical direction is formed so as to be in a tapered state.

Further, a liquid crystal is applied to a display panel portion in the above-described embodiment, and it is possible to apply a plasma display panel to a display panel portion in the above-described embodiment.

Further, in the above-described embodiment, the present invention is applied to the liquid crystal display apparatus 1 which is a monitor formed so as to be vertically long, however, it is naturally possible to apply the present invention to a monitor formed so as to be horizontally long. Here, in a case of a monitor formed so as to be vertically long as described in the above-described embodiment or in a case of a large monitor, a size of the monitor is comparatively vertically long, maldistribution of temperature along a vertical direction is significant, and, it is possible to achieve particularly effective results when the present invention is used.

The invention claimed is:

1. A display apparatus, comprising:
  a driving circuit portion driving a display panel portion in a flat shape while a light source is arranged on a back surface side of the display panel portion, and the driving circuit portion and a power unit which supplies electric power to the driving circuit portion are arranged on the back surface side;
  a case which forms a housing space for housing both the driving circuit portion and the power unit with the display panel portion;
  a partitioning wall portion which divides the housing space of the case;
  a gap which is formed between the display panel portion and the partitioning wall portion; and
  a cooling fan which leads outside air into the gap and which is arranged on the partitioning wall portion,
  wherein the driving circuit portion and the power unit are arranged on an opposite side of the partitioning wall portion against the gap,
  wherein the gap is shrunk along a direction from a downside to an upside of the display panel portion,
  wherein the gap is set to be wide in an area at which the cooling fan is arranged and is set to be narrow in an area at which the power unit is arranged,
  wherein the partitioning wall portion is tapered between the wide area and the narrow area of the gap,
  wherein the driving circuit portion is fixed on the partitioning wall portion in the narrow area of the gap, and the driving circuit portion is fixed on the partitioning wall portion so as to be positioned lower than the power unit,
  wherein the partitioning wall portion comprises:
    a first flat portion at a lower portion of the partitioning wall portion;
    a second flat portion at an upper portion of the partitioning wall portion; and
    a tapered portion between the first flat portion and the second flat portion,
  wherein the power unit is fixed at the second flat portion, and
  wherein the gap has a uniform thickness at the first flat portion, has a uniform thickness at the second flat portion, and is formed to shrink in a tapered form at the tapered portion.

2. A display apparatus according to claim 1, wherein the partitioning wall portion comprises a metallic plate for bracing the display panel portion from backside.

3. A display apparatus according to claim 1, wherein a portion of the partitioning wall portion comprises a circuit board mounting the driving circuit portion.

4. A display apparatus according to claim 1, wherein a portion of the partitioning wall portion comprises a circuit board mounting the power unit.

5. A display apparatus according to claim 1, wherein the cooling fan comprises a multiblade fan which leads the outside air along a direction of an axis which is perpendicular to the display panel portion and which blows the outside air along a direction which is parallel with the display panel portion.

6. A display apparatus according to claim 1, wherein the cooling fan is fixed on a lower position of the partitioning wall portion on a side facing the gap.

7. A display apparatus according to claim 1, wherein the driving circuit portion and the power unit are located in a side surface of the partitioning wall portion and the gap is located in another side surface of the partitioning wall portion.

8. A display apparatus according to claim 7, wherein the gap extends from said another side surface of the partitioning wall portion to the display panel portion.

9. A display apparatus according to claim 1, wherein the first flat portion extends in parallel with a back surface of the display panel portion.

10. A display apparatus according to claim 9, wherein the tapered portion obliquely extends from an edge portion of the first flat portion such that the tapered portion gradually approaches to the back surface of the liquid crystal display panel portion in a direction from the downside to the upside of the display panel portion.

11. A display apparatus according to claim 10, wherein the second flat portion extends from an edge portion of the tapered portion in parallel with the back surface of the display panel portion.

12. A display apparatus according to claim 11, wherein, in an entirety of the first flat portion, the thickness of the gap is constant.

13. A display apparatus according to claim 12, wherein, in an entirety of the second flat portion, the thickness of the gap is constant.

14. A display apparatus according to claim 1, wherein, in an entirety of the first flat portion, the thickness of the gap is constant, and
  wherein, in an entirety of the second flat portion, the thickness of the gap is constant.

15. A display apparatus, comprising:
  a driving circuit portion driving a display panel portion in a flat shape while a light source is arranged on a back surface side of the display panel portion, and the driving circuit portion and a power unit which supplies electric power to the driving circuit portion are arranged on the back surface side;
  a case which forms a housing space for housing both the driving circuit portion and the power unit with the display panel portion;

a partitioning wall portion which divides the housing space of the case;

a gap which is formed between the display panel portion and the partitioning wall portion; and a cooling fan which leads outside air into the gap and which is arranged on the partitioning wall portion, wherein the driving circuit portion and the power unit are arranged on an opposite side of the partitioning wall portion against the gap, wherein the gap is formed in a shape in which an air velocity is increased along a direction from a downside to an upside of the display panel portion., wherein the partitioning wall portion comprises:
- a first flat portion at a lower portion of the partitioning wall portion;
- a second flat portion at an upper portion of the partitioning wall portion; and
- a tapered portion between the first flat portion and the second flat portion, wherein the power unit is fixed at the second flat portion, wherein the driving circuit portion is fixed on the partitioning wall portion so as to be positioned lower than the power unit, and wherein the gap has a uniform thickness at the first flat portion at which the air velocity is constant, has a uniform thickness at the second flat portion at which the air velocity is constant, and is formed to shrink in a tapered form at the tapered portion at which the air velocity is increased.

16. A method of displaying an image in a display apparatus, said method comprising:

driving a display panel portion of the display apparatus in a flat shape while a light source is arranged on a back surface side of the display panel portion, and a driving circuit portion and a power unit which supplies electric power to the driving circuit portion are arranged on the back surface side, wherein a case forms a housing space for housing the driving circuit portion and the power unit with the display panel portion, wherein a partitioning wall portion divides the housing space of the case, and wherein a gap is formed between the display panel portion and the partitioning wall portion; and leading outside air into the gap by a cooling fan which is arranged on the partitioning wall portion, wherein the driving circuit portion and the power unit are arranged on an opposite side of the partitioning wall portion against the gap, wherein the gap is shrunk along a direction from a downside to an upside of the display panel portion, wherein the partitioning wall portion includes:
- a first flat portion at a lower portion of the partitioning wall portion;
- a second flat portion at an upper portion of the partitioning wall portion; and
- a tapered portion between the first flat portion and the second flat portion, wherein the power unit is fixed at the second flat portion, wherein the driving circuit portion is fixed on the partitioning wall portion so as to be positioned lower than the power unit, and wherein the gap has a uniform thickness at the first flat portion at which the air velocity is constant, has a uniform thickness at the second flat portion at which the air velocity is constant, and is formed to shrink in a tapered form at the tapered portion at which the air velocity is increased.

* * * * *